United States Patent Office 3,260,911
Patented July 12, 1966

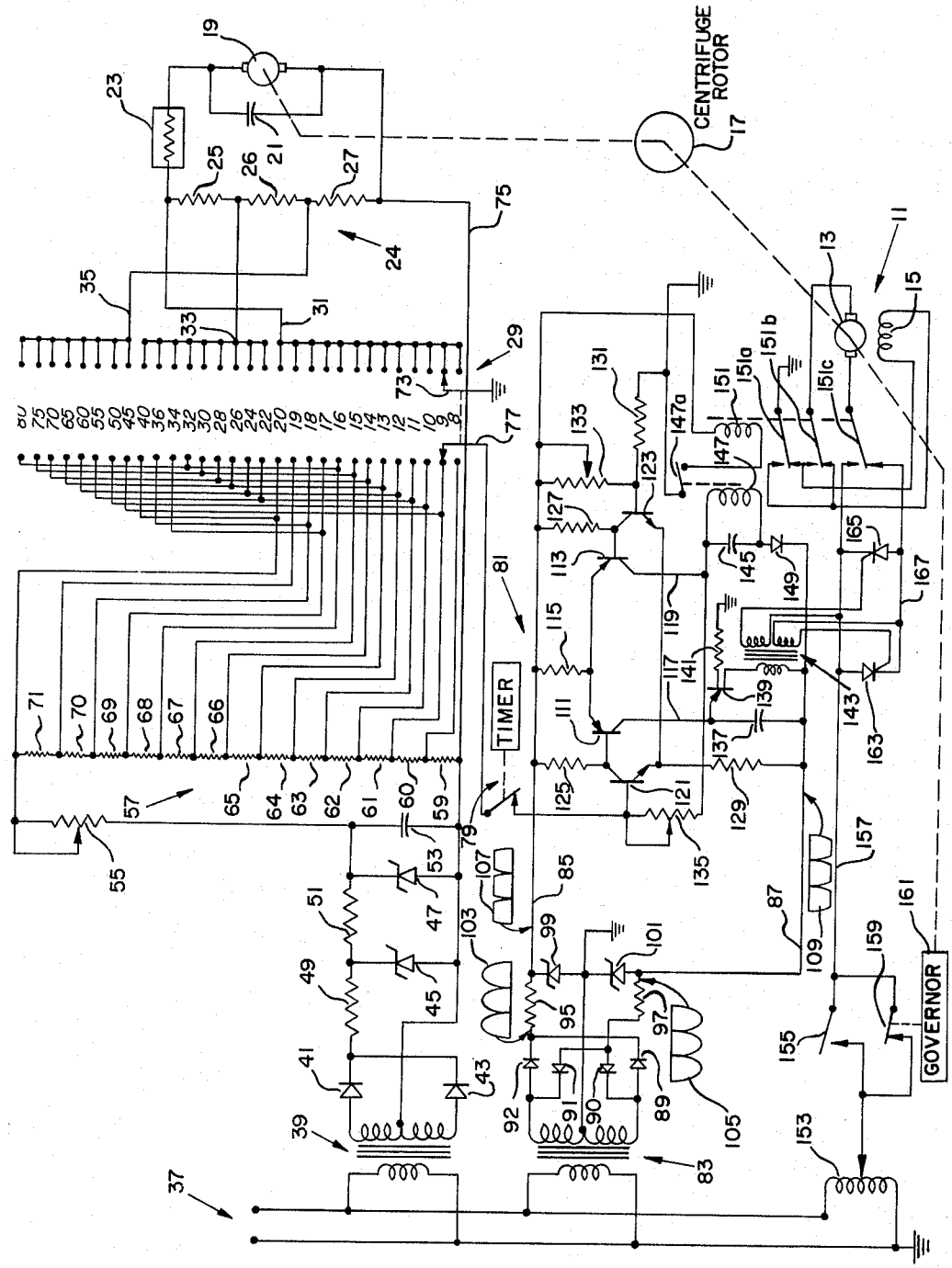

---

3,260,911
HIGH SPEED CENTRIFUGE AND SPEED CONTROL CIRCUIT THEREFOR
Svein B. Rasmussen, Mountain View, Calif., assignor to Beckman Instruments, Inc., a corporation of California
Filed Jan. 30, 1963, Ser. No. 254,959
5 Claims. (Cl. 318—338)

This invention relates to high speed centrifuge devices, and to speed control circuits therefor. More particularly this invention relates to speed control circuits of the type for use with centrifuge apparatus wherein extremely accurate control is required.

Centrifuge speed control devices of the prior art have included many various principles of operation including, among others, saturable reactors in series with the motor to be controlled; constant A.-C. frequency devices and the like. These prior art devices, however, have various disadvantages which limit their utility. Saturable reactors have been inherently bulky, while constant frequency devices require meticulously designed circuitry.

It is a general object of this invention to provide an improved speed control circuit for centrifuge devices.

It is a more particular object of this invention to provide an improved speed control circuit for devices such as centrifuges and the like wherein a high degree of accuracy is required.

It is another object of this invention to provide a speed control circuit of the aforementioned character which incorporates a braking means.

It is still a further object of this invention to provide a speed control circuit which includes single circuit means not only for braking the control device to a complete stop but also for maintaining the speed of the device during normal running time.

It is still a further object of this invention to provide a speed control circuit of the aforementioned character employing a differential amplifier together with feed back means therein to provide stability to the network.

These and other objects and features of the invention will become more clearly apparent upon a review of the following description in conjunction with the accompanying drawing in which the single figure is a schematic diagram of a speed control circuit in accordance with one embodiment of this invention.

Referring to the drawing there is shown a motor 11, the speed of which is to be controlled. The motor includes an armature 13 and a field coil 15 which together form an electrical load for the circuit to be described. The armature 13 is mechanically coupled to a mechanical load device, such as a centrifuge rotor 17, and also to the armature of a generator type tachometer 19. Capacitor 21 is connected across the tachometer 19 for the suppression of ripple and a thermistor 23 is connected in series to provide temperature stability of the system. A voltage divider 24 network including resistors 25, 26 and 27 is connected across the series combination including the tachometer 19 and the thermistor 23. A two-pole multiposition switch 29 has the terminals of one pole connected to the voltage divider 24.

The switch 29 may be considered as a speed selection switch and the various terminals thereof may be designated in terms of the various speed settings for the centrifuge rotors 17. In the example shown the first thirteen terminals from the bottom are connected to the junction of the resistor 25 and the thermistor 23 and corresponds to speed settings of 800 r.p.m. to 2,000 r.p.m. in individual steps of 100 r.p.m.

The next nine terminals of the switch 29 are connected to the junction of resistors 25 and 26 and relate to speeds of 2,200 r.p.m. to 4,000 r.p.m. in steps of 200 r.p.m. (with the omission of the step for 3,800 r.p.m. for fabrication simplification). The last eight terminals of the switch 29 are connected to the junction of the resistors 26, 27 and correspond to rotor speeds of 4,500 r.p.m. to 8,000 r.p.m. in steps of 500 r.p.m.

Thus, it is apparent that the tachometer 19 produces an output voltage, one side of which appears on the righthand terminals of the switch 29. For the first thirteen settings of the switch 29 the full output of the tachometer 19 is applied to the switch terminals. On the next nine terminals the voltage applied to the switch 29 from the generator is in proportion as the value of resistors 26 and 27 is to the total value of the resistors 25, 26 and 27; while the output applied to the last eight terminals from the tachometer is in proportion to the value of resistor 27 to the total value of the resistors 25, 26 and 27. For instance, the resistors 25, 26 and 27 may have values of 5,000, 3,000, 2,000 ohms, respectively, whereby the output on the line 33 will be one-half of that on the line 31 and the output on the line 35 will be one-fifth that of the line 31.

A source of A.-C. voltage 37 is connected to the primary of a transformer 39. The secondary of the transformer 39 is connected to a full wave rectifier including the diodes 41 and 43, the output of which is regulated by the Zener diodes 45 and 47 and filtered by the resistors 49, 51 and capacitor 53. A variable resistance 55 is connected in series with the power supply in order to adjust the potential across a voltage divider 57 to a given value.

The voltage divider 57 includes a plurality of resistors 59 through 71. The resistors 60 to 71 may each have the same value, while the value of the resistor 59 may be eight times the value of the others, to correspond with the first step of the switch 29 being eight times greater than subsequent steps. The various taps of the voltage divider 57 are connected to the lefthand terminals of the switch 29 with the junctions of the several resistors thereof being connected to the lower lefthand terminals 8 to 20 in order. The lefthand terminals for speeds of 2,200 r.p.m. to 4,000 r.p.m. are each connected to the lower terminal having one-half that speed value. Thus the terminal for a speed 3,200 r.p.m. is interconnected with the terminal for the speed 1,600 r.p.m., etc. The lefthand terminals for speeds of 4,500 r.p.m. to 8,000 r.p.m. are each connected to the lower terminal having one-fifth that speed value. For instance, the lefthand terminal for the speed 7,000 r.p.m. is interconnected with the terminal for the speed 1,400 r.p.m.

The righthand wiper 73 of the switch 29 is grounded and a current path exists therethrough, through one of the lines 31, 33 or 35 dependent upon the position of the switch and one or more of the resistors 25, 26 and 27, through the line 75 to the lower end of the voltage divider 57. The current path continues through the voltage divider 57 (again dependent upon the position of switch 29), one of the lefthand terminals of the switch 29 and the wiper 77 thereof.

The line 77, then, may be considered the output of the aforementioned circuit and is connected through a timer switch 79 to the input of a differential amplifier 81. The differential amplifier 81 is coupled to a transformer 83 connected to the source of potential 37. The transformer 83 includes a grounded center-tap secondary winding. The opposite sides of the secondary are connected to the B+ and B− lines 85 and 87 respectively, through the rectifier networks including the diodes 89 to 92. The output of the rectifier is applied through decoupling resistors 95 and 97 to the Zener diodes 99 and 101.

Since the power supply of the amplifier circuit does not include filters, the current through the resistors 95 and 97 is pulsating as shown on the inserted curves 103 and 105 respectively. For the purpose of this specification "pulsating" current is defined as that which periodically reduces to substantially zero. The current through the lines 85 and 87, after clipping by the Zener diodes 99 and 101, is as shown by the inserted curves 107 and 109. It should be understood that upon each cycle of operation the current in the lines 85 and 87 is reduced to zero.

The differential amplifier further includes p-n-p transistors 111 and 113 connected by a common emitter resistor 115 to the line 85. The output of the transistors 111 and 113 appear at their collectors and on the lines 117 and 119 to be utilized as set forth hereinafter. The input of the transistors 111 and 113 is applied from n-p-n transistors 121 and 123 respectively, each of which has its collector connected to the line 85 through a resistor 125 and 127, respectively. The emitters of the transistors 121 and 123 are connected through the B— line 87 through the common emitter resistor 129. Base bias is applied to the transistor 123 through the voltage divider including the resistors 131 and 133 connected between ground and the line 85. Input from the line 77 through the switch 79 is applied to the base of the transistor 121. The output from the line 119 is applied to the base of the transistor 121 through the resistor 135 to provide a lag-type feedback.

The collector of the transistor 111 is connected through the line 117 and the capacitor 137 to the line 87. The junction of that collector and capacitor is connected to the emitter of a unijunction transistor 139. One of the base terminals of the transistor 139 is connected to ground through a resistor 141 while the other base terminal is connected to the line 87 through the primary of a transformer 143. The secondary of the transformer 143 is connected as described hereinafter.

The output of the transistor 113 is connected through the line 119 to the series parallel combination of a capacitor 145, relay coil 147 and diode 149 to the line 87. One side of the contacts 147a of the relay are connected to ground while the other side is connected through a relay coil 151 to the line 85. The contacts 151a, 151b and 151c of the latter relay are described hereinafter.

A variable autotransformer 153 is connected to the source of power 37 and has its output connected through a manual normally open switch 155 to the line 157. A switch 159 controlled by a centrifugal governor 161 or the like, is connected in parallel with the switch 155. The governor 161 is coupled to the motor 11 and rotor 17 and the switch 159 is set to open when the speed of the rotor is reduced below a predetermined value.

A pair of silicon controlled rectifiers 163 and 165 are connected in parallel opposition between the line 157 and line 167. The cathode and gate of each of the rectifiers 163 and 165 are connected to different secondaries of the transformer 143 whereby they are controlled dependent upon the output of the transistor 139.

With the relay contacts 151a, 151b, 151c in their normal condition as shown, it is seen that the line 167 is connected through the normally closed contact of terminal 151c to the motor armature 13. Thus power to the motor armature is applied from the variable output of the transformer 153 and controlled by the silicon controlled rectifiers 163 and 165. The opposite side of the motor armature 13 is connected to the field winding 15 through a reversing switch including the contacts 151a and 151b and thence to ground. Upon energization of the relay 151 it is apparent that the output of the autotransformer 153 is applied to the armature 13 directly through the normally open contacts 151c while at the same time the current to the field 13 is reversed due to the operation of the contacts 151a and 151b.

In operation the speed at which the centrifuge rotor 17 is to be operated is set by the switch 29. The setting as shown in the drawing is for 900 r.p.m. With this setting it is apparent that the full output of the tachometer 19 is employed and is placed in opposition with the potential across the resistors 59 and 60 whereby their difference is applied along the line 77.

Under starting conditions, with the tachometer 19 at rest, the output along the line 77 will be determined solely by the voltage across the resistors 59 and 60 and will, by way of example, be +3.6 volts. This +3.6 volts is applied to the base of the transistor 121 causing heavy conduction and consequently the conduction of the transistor 111. With the conduction of transistors 121 and 111, the conductor of the transistors 113 and 123 is reduced due to the common emitter resistors 115 and 129. Transistor 111 thus rapidly charges the capacitor 137. When the charge upon the capacitor 137 reaches a peak voltage the unijunction transistor 139 begins to conduct. The transistor 139, then, acts as a constant voltage breakdown or negative resistance device. Conduction of the transistor 139 continues until the potential on the line 87 reaches zero as expressed by the curve 109. Thus although the capacitor 137 may be charged and discharged several times during the course of one cycle of current on the line 87, the Zener junction transistor 139 continues operation and current is passed through the transformer 143. It is apparent therefore that the proportion of any individual cycle of current on the line 87 during which conduction exists through the transformer 143, is dependent upon the rate of conduction of the transistor 111 and of charging the capacitor 137. In addition, it is obvious that the proportion of each cycle passed from the line 157 to the line 167 through the controlled rectifiers 163 and 165 is also dependent upon the charging of the capacitor 137.

When initiating operation, the manual switch 155 is closed and the voltage on the line 157 is gradually increased by manual operation of the autotransformer 153. Since, at this point, the transistor 111 conducts heavily, the controlled rectifiers 163 and 165 will permit substantially total current to pass from the line 157 to 167. This current is passed through the contacts 151c to the motor armature 13 and thence through the contacts 151b to the field winding 15 and to ground through contacts 151a.

As motor speed and consequently, the speed of the centrifuge rotor 17 increases toward that indicated on the switch 29, the influence of the tachometer 19 becomes felt. Thus the positive potential across the resistors 59 and 60 is gradually offset by the negative potential produced by the tachometer 19. As this positive potential is reduced the conduction of transistor 121 and consequently of transistor 111 is also reduced. This reduced conduction causes slower charging of the capacitor 137 and consequently a greater proportion of each cycle pasesses before breakdown of the transistor 139. Thus it is apparent that a smaller proportion of the current cycle will be permitted to pass through the controlled rectifiers 163 and 165 and less power is applied to the armature 13.

Eventually an equilibrium results wherein the output of the tachometer 19 just balances the potential across the resistors 59 and 60 and the proper proportion of power from the line 157 is passed to the motor 11 for stable and continuous operation of the motor. It should be realized that this condition of equilibrium may be facilitated by adjusting the variable autotransformer 153 in accordance with the speed desired and the load employed.

As the speed of the motor and the centrifuge rotor 17 increases the switch 159 is closed by the governor 161 and the manual switch 155 may be opened. At this point the circuit is operable to automatically maintain the speed of the motor 11, and the centrifuge rotor 17 at that speed determined by the setting of the switch 29.

In the event that the motor 11 and rotor 17 are operated too fast, the negative output of the tachometer 19 becomes substantially equal to or greater than the voltage across the resistors 59 and 60 such that a zero or negative potential is applied through the line 77 to the base of the transistor 121. Thus the transistor 121 and the transistor 111 would be cut off causing heavier conduction of the transistors 113 and 123. This heavier conduction will cause a braking action on the motor by operation of the relays 147 and 151. Such braking action is caused by the reversal of current to the field 15 such that the operation of the motor tends to be the reverse of its original operation. In addition, the contact 151c moves to its normally open terminal whereby the full power from the autotransformer 153 is applied rather than that controlled by the rectifiers 163 and 165. Consequently, the speed of the motor is quickly reduced and the output of the tachometer 19 is likewise reduced until a point at which the transistor 121 was again caused to conduct.

In ordinary operations of the centrifuge apparatus, a specific time of run is required and may be set on a device such as a timing switch 79. Thus upon the expiration of the time set, the switch 79 opens thereby removing the positive potential to the transistor 121. Consequently, the transistor 121 will cease conducting in a manner similar to that described above with respect to over speed of the motor. The switch 79 may also be of the manual type or a combination of a manual and time type whereby contacts may be opened at will.

Whereas in the over speed situation the relay contacts 151a, 151b and 151c eventually returned to their normal condition upon the reapplication of a positive signal to the transistor 121 such is not the case in the event that the switch 79 is opened. In this latter condition, reverse energization of the motor field 15 is continued until the motor is substantially stopped. Further continued energization of the field would cause the motor to be rotated in reverse direction. In order to avoid this reverse rotation, the governor 161 and the switch 159 are employed. The operation of the governor 161 may cause opening of the switch 159 when the motor armature 13 reaches a speed of, for instance, one revolution per minute or less. Thus at the speed of one r.p.m. the autotransformer 153, the line 157 and consequently, the motor 11 are disconnected to its source of power, the autotransformer 153. Without the source of power, the motor will eventually coast to a complete stop. In order to begin operation in the system again the manual switch 155 must again be closed.

A circuit in accordance with the foregoing has been constructed and operated employing the following components:

Power supply:
 37–115 volts _____ 60 cycle.

Transistors:
 111 _____ 2N466.
 113 _____ 2N466.
 121 _____ 2N1306.
 123 _____ 2N1306.
 139 _____ 2N490.

Diodes:
 41 _____ 1N1696.
 43 _____ 1N1696.
 45 _____ 1N3027.
 47 _____ 1N937.
 89 _____ 1N1696.
 90 _____ 1N1696.
 91 _____ 1N1696.
 92 _____ 1N1696.
 99 _____ 1N3027.
 101 _____ 1N3027.
 149 _____ 1N1696.
 163 _____ 2N685.
 165 _____ 2N685.

Transformers and relays:
 39 _____ Triad No. N–68X.
 83 _____ Triad No. N–68X.
 143 _____ Sprague No. 31Z382.
 147 _____ Potter & Brumfield PW5LS.
 151 _____ Square-D Model No. BH040.
 153 _____ Superior Electric No. 136.

Capacitors:
 21 _____ 100 μfd.
 53 _____ 100 μfd.
 137 _____ 0.1 μfd.
 145 _____ 100 μfd.

Resistors:
 23 _____ 100Ω thermistor.
 25 _____ 5KΩ.
 26 _____ 3KΩ.
 27 _____ 2KΩ.
 49 _____ 3KΩ.
 51 _____ 1KΩ.
 55 _____ 250Ω.
 59 _____ 1600Ω.
 60 _____ 71–200Ω each.
 95 _____ 3KΩ.
 97 _____ 3KΩ.
 115 _____ 6.8KΩ.
 125 _____ 56KΩ.
 127 _____ 56KΩ.
 129 _____ 51KΩ.
 131 _____ 3KΩ.
 133 _____ 1 meg.Ω.
 135 _____ 1 meg.Ω.
 141 _____ 470Ω.

The foregoing circuit upon operation has been found to produce centrifuge rotor speeds from 800 to 8,000 revolutions per minute, and with additional gear couplings, up to 80,000 revolutions per minute. The average speed error for any run was less than ±0.1% for the set speed. The instantaneous speed error was also less than ±0.1% of the average speed run. These errors were maximum with temperatures ranging from 15° C. to 30° C., with relative humidities up to 95% and with line voltage variations from 100 to 128 volts.

I claim:

1. A speed control system for motor driven devices including motors of the type having rotor and field windings comprising a tachometer mounted to produce an electrical potential having a magnitude dependent upon speed, a source of reference potential, means for receiving the tachometer potential and the reference potential and providing a difference signal, an amplifier connected to receive said difference signal and providing a first output signal when the difference signal is above a predetermined level and a second output signal when the difference signal is below said level, a source of power for driving said motor, means for controlling the power applied from the source to the motor in response to said first signal to control the speed of the motor in a desired direction, and switching means responsive to the second signal for reversing the direction of current in the field winding and applying power directly from the power source to the motor and subsequently responsive to said first output signal to return to the original direction of current in the field winding reestablishing the power source.

2. A speed control system as in claim 1 including governor means arranged to sense the speed of the motor and serving to disconnect the source of power from the motor when the motor reaches a selected low speed after the direction of current in the field winding is reversed.

3. A speed control system as in claim 1 including means for disconnecting the difference signal applied to the amplifier whereby when the difference signal is below said predetermined level and the direction of current in the field winding is reversed.

4. A speed control system as in claim 3 including governor means arranged to sense the speed of the motor and serving to disconnect the source of power from the motor when the motor reaches a selected low speed after the direction of current in the field winding is reversed.

5. A speed control system for motor driven devices including motors of the type having rotor and field windings comprising a tachometer mounted to produce an electrical potential having a magnitude dependent upon speed, a source of reference potential, means for receiving the tachometer potential and the reference potential and providing a difference signal, an amplifier connected to receive said difference signal and providing a first output signal when the difference signal is above a predetermined level and a second output signal when the difference signal is below said level, a source of power for driving said motor, means for controlling the power applied from the source to the motor in response to said first signal to control the speed of the motor in a desired direction, switching means including a circuit comprising a coil connected in parallel with the capacitor and in series with the rectifier responsive to the second signal for reversing the direction of current in the field winding and applying power directly from the power source to the motor, and means for applying the potential across said circuit to the input to said amplifier to stabilize the system.

References Cited by the Examiner

UNITED STATES PATENTS

| | | | |
|---|---|---|---|
| 2,899,619 | 8/1959 | Wiedemann | 318—374 |
| 2,964,691 | 12/1960 | Dinger | 318—338 |
| 3,026,464 | 3/1962 | Greening et al. | 319—331 X |
| 3,037,157 | 5/1962 | Young | 318—331 X |
| 3,090,901 | 5/1963 | Shaw | 318—209 |
| 3,095,534 | 6/1963 | Cockrell | 318—331 X |

MILTON O. HIRSHFIELD, *Primary Examiner.*

ORIS L. RADER, *Examiner.*

D. F. DUGGAN, S. GORDON, *Assistant Examiners.*